Nov. 9, 1926.
J. F. MARTIN
1,606,438
LUGGAGE CARRIER
Filed May 27. 1926    2 Sheets-Sheet 2
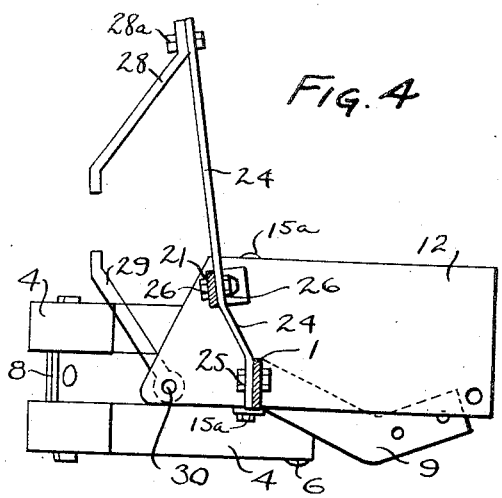
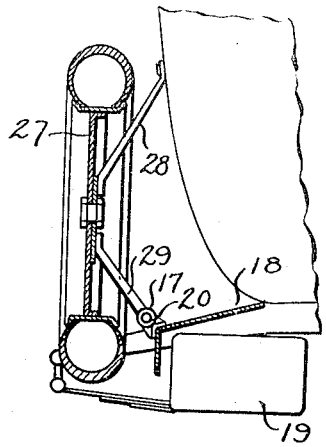
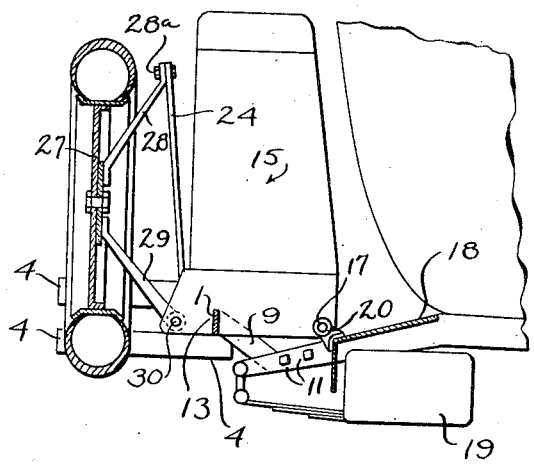
INVENTOR
Jacob F. Martin
ATTORNEYS Patented Nov. 9, 1926.

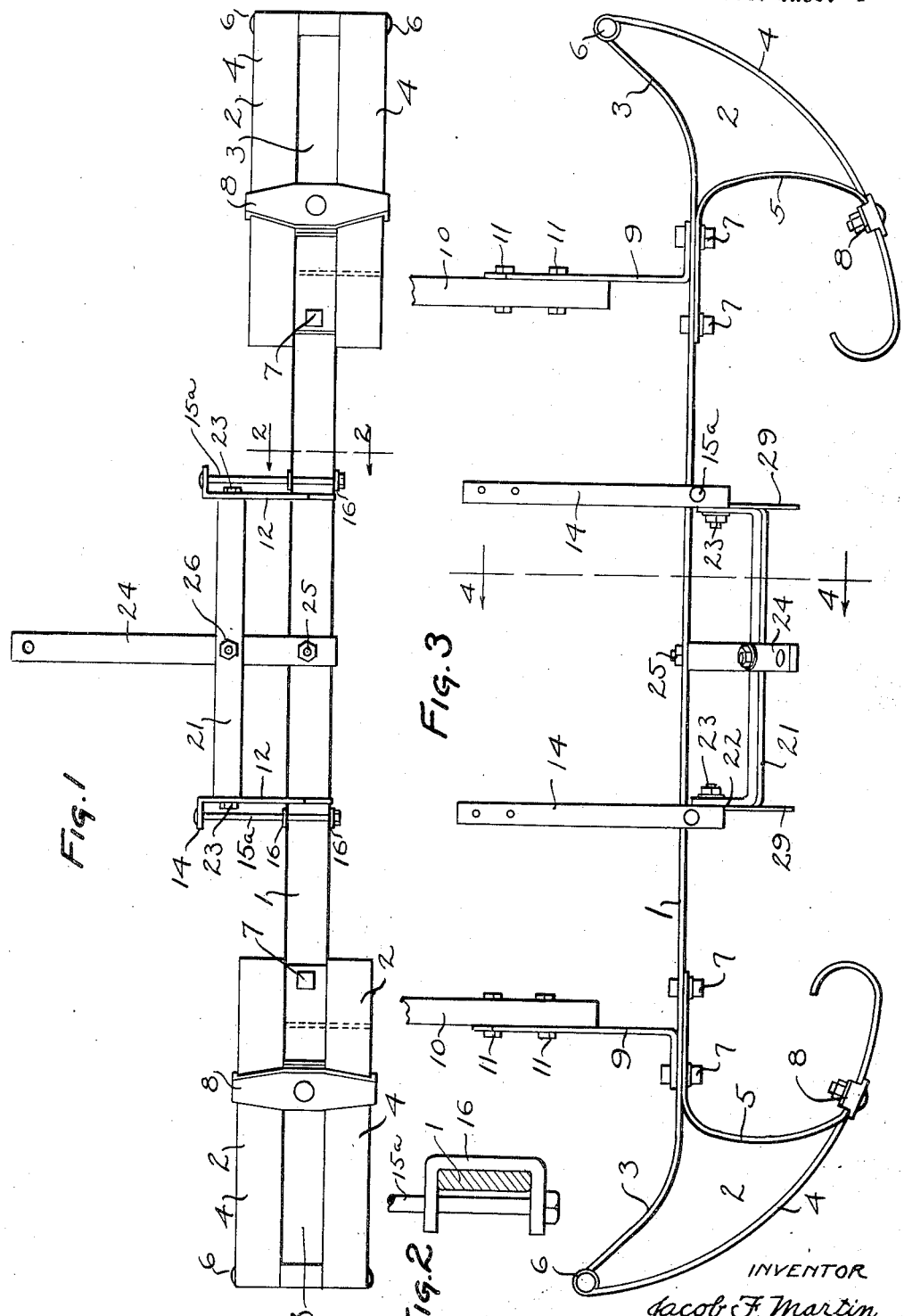

1,606,438

UNITED STATES PATENT OFFICE.

JACOB F. MARTIN, OF BELLEVUE, OHIO.

LUGGAGE CARRIER.

Application filed May 27, 1926. Serial No. 112,141.

This invention relates to improvements in luggage carriers for use principally on automobiles.

The object of the invention is to combine the luggage carrier proper with a cross bar or member of the rear bumper, to utilize the latter as the main support for the carrier proper; and to combine this arrangement with other fastening means by which the forward portion of the carrier proper may also be connected with the chassis of the machine.

A further object of my invention, when this luggage carrier is to be mounted on automobiles which already have spare tire supports at the rear, is to utilize the means of attachment of such extra tire support to the chassis as the means for attaching the forward portion of my luggage carrier proper to the chassis.

And a further object of my invention is to equip my luggage carrier with means for supporting the spare tire carrier as well in those cases where no spare tire carrier is on the automobile when I apply my luggage carrier as in those cases where the machine already has secured to it a spare tire carrier; so that in either case my invention comprehends means for supporting the spare tire carrier by a connection between it and my luggage carrier.

These several objects are carried out in practice by the arrangement and construction hereinafter described in detail.

In the accompanying drawings, forming a part of this specification and in which like numerals indicate corresponding parts, Figure 1 is a rear elevation of my luggage carrier with the devices for making connection with the spare tire carrier, and of the rear bumper of an automobile;

Figure 2 is a detail view of the bumper bar in cross section and the clips used in connection with the tie bolts by which the plates of the luggage carrier are clamped to the cross bar of the fender;

Figure 3 is a plan view of the devices shown in rear elevation in Figure 1;

Figure 4 is a detail enlarged side elevation of my luggage carrier with some of the parts in cross section;

Figure 5 is a side elevation of the rear portion of an automobile with an extra tire carrier mounted thereon;

Figure 6 is a similar view with my luggage carrier mounted on the chassis, and the extra tire carrier supported by my luggage carrier.

In the drawings, the numeral 1 designates the main or cross bar of a conventional rear bumper, which in the present instance is shown equipped at its ends with so-called "bumperettes", indicated at the numeral 2, which form protections for the rear fenders of the automobile. In the particular form of bumper illustrated in Figures 1 and 3 the bumperette is composed of extensions 3 of the rear-cross bar 1 and of additional members 4 and 5, the member 4 being hinged to the extension 3 at the point 6, and the member 5 being secured to the cross-bar 1 by the securing means indicated at 7, while the members 4 and 5 are themselves interconnected by the clamping device indicated at 8.

This rear bumper is equipped with brackets 9 secured to the cross-bar 1 by the fastening devices 7 and extending rearwardly to overlap and fit against the side bars 10 of the usual automobile chassis. Bolts and nuts 11 are employed to secure the brackets 9 to the side-bars of the chassis whereby the machine is equipped with this rear bumper.

Referring now to my luggage carrier, it will be seen to consist of side plates 12 which are slotted at 13 to fit over the rear cross-bar 1 of the bumper, so that these side plates rest and ride upon this bumper bar. These plates are preferably two in number, and each is formed at its upper edge with bent-over portions 14 to form flanges upon which the luggage trunk or container, indicated at 15, is mounted, and secured in any desired manner. These flanges also receive tie bolts $15^a$ which extend down past the bumper bar 1 and thru clips indicated by 16 in Figure 2, where they are seen to embrace the cross-bar 1 of the bumper. By this arrangement the plates 12 of the luggage carrier are clamped to the bumper bar, in addition to their connection therewith by reason of fitting over the bar through the medium of the slot 13—see Figure 6.

Referring now to the remainder of the connection between the luggage carrier and the machine, attention is first directed to Figure 6 where it will be seen that the forward lower portions of the plates 12 are secured to the chassis. In the form of connection shown, brackets 17 are secured to the chassis, preferably to a guard or shield 18, which comes with some cars as a protection to the gasoline tank 19. If the car has such a shield, it forms a convenient place for the attachment thereto of the brackets 17. If the car has no such shield, then these brackets are otherwise secured, as the particular installation may require. Bolts 20 pass through the side plates 12 and these brackets 17. In cases where these brackets, or their equivalent, are already on the car and form a part of the means of connecting the extra tire carrier with the chassis, as shown in Figure 5, then on removing the tire carrier connections I insert in their place my luggage plates 12. But in cases where the extra tire carrier is not so mounted as to carry out this plan, then I place original fastening devices on the chassis in such wise as that these devices will connect to the machine my side plates 12.

In either case, my luggage carrier thus becomes properly mounted and secured on and at the rear of the car, and in any case the said plates find their principal support on the cross-bar 13, which may be a mere cross-bar attached to the chassis as seen in Figure 3, or may have mounted in connection therewith the bumperettes indicated generally at 2; but the function of supporting my luggage carriers is performed by this cross-bar element 13.

Then in order to mount the extra tire carrier on the machine, whether the machine is equipped at the rear with the extra tire carrier previous to the mounting thereon of my luggage carrier, or whether such extra tire carrier is to be later added after my luggage carrier has been installed, I provide the plates 12 with means for connecting therewith the extra tire carrier. In the form shown these means consist of a brace 21 extending from one plate 12 to the other, as seen in Figures 1 and 2, the ends of the brace being turned as indicated at 22 to fit against the sides of the plates 12 where they are held by nuts and bolts 23, and of a rigid bar 24 secured at its lower end by a bolt and nut 25 to the cross-bar 1 and to the brace 21 by a bolt and nut 26. This rigid bar extends upward and preferably slightly rearward, being thus securely supported by the luggage carrier and adapted to connect with the extra tire carrier 27, of any conventional type, through the intermediary of the member 28 which is bolted as at 28ª to the upper end of the rigid bar 24 and at its lower end connected with the tire carrier proper 27.

To further connect the tire carrier to my luggage carrier I also utilize the lower member 29 which at the point 30 is secured to the side plate 12. It is to be understood that there are two of these members 29, as seen in Figure 3.

It will now be understood that I utilize my luggage carrier, equipped with the cross brace 21 and the rigid bar 24, to support and carry the extra tire carrier whose members 28 and 29 are connected with the luggage carrier in the manner shown and described; and that I thus utilize my luggage carrier whether the automobile comes equipped with the extra tire carrier when I mount my luggage carrier thereon, or is later equipped with the extra tire carrier. Of course, I need not utilize the means of connections, or any of them, which are employed to mount the extra tire carrier on the machine when I come to attach my luggage carrier to the machine, as I may provide extra or new means for such attachment in addition to the cross-bar 1, which later generally will be the cross-bar of the rear bumper; but I may utilize, if the customer so desires, the extra tire carrier mounting-means, an optional matter.

The feature I wish to emphasize is that of the mounting of my luggage carrier upon the cross-bar 1, which will usually be the cross member of the rear bumper, in connection with their attaching means as between the luggage carrier and the automobile. A further feature which I also wish to emphasize is that of utilizing my luggage carrier, so mounted, as the instrumentality upon which or to which the extra tire carrier is mounted and secured.

Having thus fully described my invention what I now desire to claim as new is:

1. The combination with a luggage carrier, comprising side plates, of the cross-bar of a bumper adapted to be secured to the chassis of an automobile and to support said side plates, and other fastening devices to connect the said plates to the machine.

2. The combination with a luggage carrier, comprising two plates each having a slot, of a cross-bar adapted to be carried by a chassis and to fit in said slots for forming a connection with and a support for said plates, and other fastening devices to secure the more forward portions of the plates to the machine.

3. The combination with a luggage carrier, comprising two vertical side plates each slotted, of a cross-bar adapted to fit within said slots and to be attached to a chassis, and tie bolts by which the side plates are secured to said cross-bar to maintain their interlocked relation, and other fastening devices to secure the side plates to a chassis.

4. The combination with a luggage carrier, comprising side plates having slots, a transverse bar adapted to connect with a chassis and fit within said slots and devices to secure said plates and bar together, of other devices carried by said plates and adapted to support an extra tire carrier.

5. The combination with a luggage carrier, comprising side plates each having a slot, a rear bumper cross-bar adapted to fit in said slots, devices to secure the cross-bar in said slots, and other fastening devices to connect the forward portions of the side plates to a chassis, of a cross-brace between said plates and a substantially upright bar secured to said brace and to said cross bar, and an extra tire carrier having members attachable to said upright bar and said plates.

In testimony whereof, I affix my signature.

JACOB F. MARTIN.